No. 873,269. PATENTED DEC. 10, 1907.
A. C. SARGENT.
WATER HEATING DEVICE.
APPLICATION FILED APR. 11, 1907.
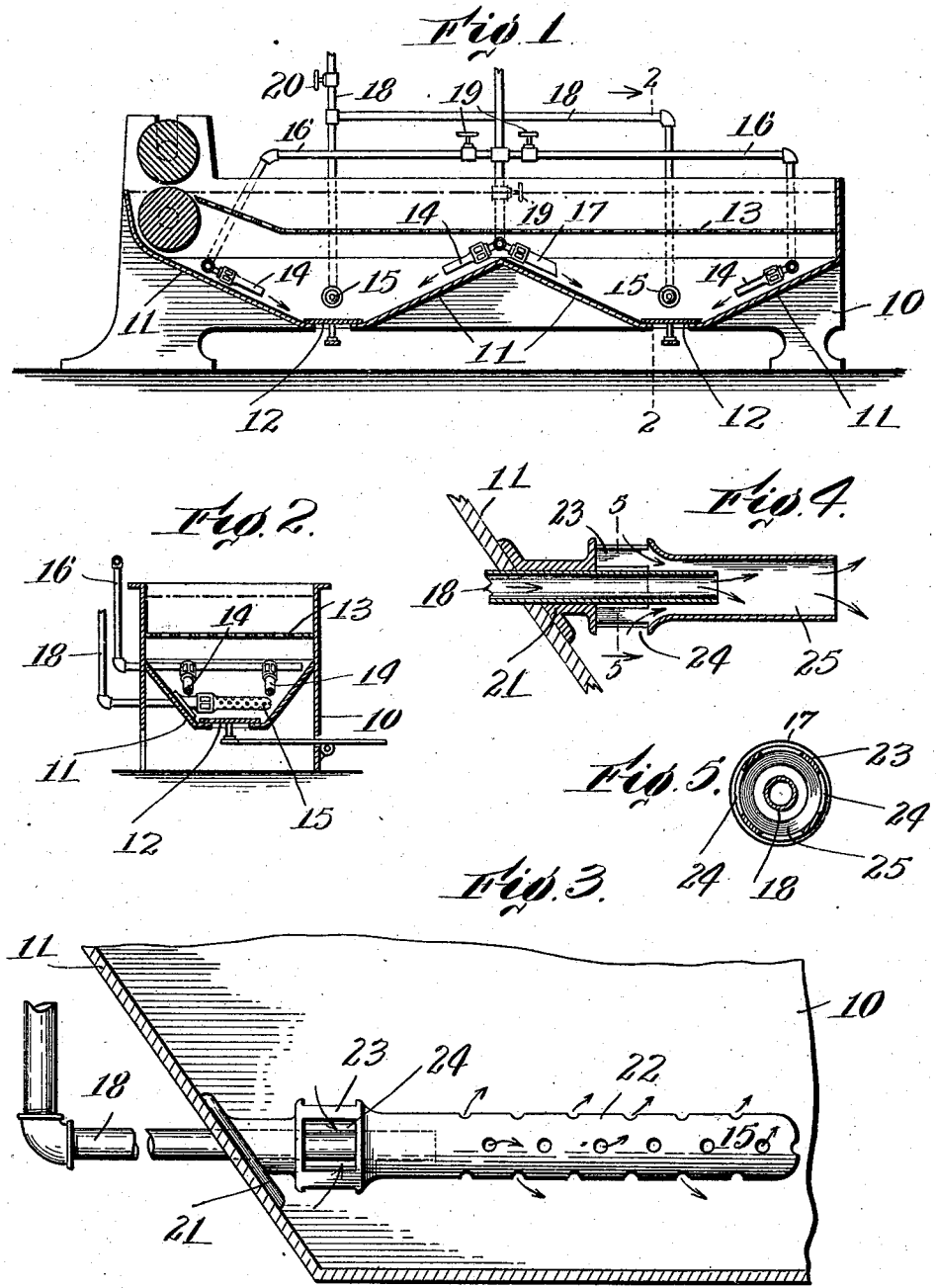

UNITED STATES PATENT OFFICE.

ALLAN C. SARGENT, OF WESTFORD, MASSACHUSETTS, ASSIGNOR TO C. G. SARGENT'S SONS, OF WESTFORD, MASSACHUSETTS, A CORPORATION OF MASSACHUSETTS.

WATER-HEATING DEVICE.

No. 873,269.  Specification of Letters Patent.  Patented Dec. 10, 1907.

Application filed April 11, 1907. Serial No. 367,510.

*To all whom it may concern:*

Be it known that I, ALLAN C. SARGENT, a citizen of the United States, residing at Westford, in the county of Middlesex and State of Massachusetts, have invented a new and useful Water-Heating Device, of which the following is a specification.

This invention relates to a device for heating water in tanks by steam.

The principal objects of the invention are to provide means for introducing steam into a tank in such a manner that the steam will be efficiently employed for heating the water and in such a way as to eliminate or reduce the pounding which usually takes place when water is heated by the introduction of steam.

Another object of the invention is to provide means whereby the sediment which may collect in the tank may be removed by the action of the steam in a rapid and efficient manner.

This invention is capable of general use wherever it is desired to heat water in a tank by means of steam, or to remove sediment from such a tank. It is especially applicable to wool washing machines, and I have illustrated it as applied thereto.

Reference is to be had to the accompanying drawings, in which,

Figure 1 is a longitudinal sectional view of a wool washing tank showing one form of my invention applied thereto. Fig. 2 is a transverse sectional view of the same on the line 2—2 of Fig. 1. Fig. 3 is a sectional view showing one of the nozzles in elevation on enlarged scale. Fig. 4 is a longitudinal sectional view of one of the nozzles in a slightly modified form, and Fig. 5 is a sectional view of the last two forms on the line 5—5 of Fig. 4 showing the hood.

Fig. 1 shows a wool washing tank 10 having the usual sloping bottoms 11 which are provided with valves 12 designed to be opened to allow the sediment to be removed. Above the sloping bottoms is a screen 13 on which the wool is placed. The water line of the tank is indicated by the dotted line near the top. Steam may be introduced into the tank in any desired place for the purpose of heating it. I have shown two sets of nozzles 14 and 15 for that purpose. The nozzles 14 are supplied from a pipe 16 and are located at the upper ends of the sloping bottoms. They are downwardly inclined so that they direct the steam and a current of water downwardly along the sloping bottoms to more efficiently and rapidly clean the same when the valves 12 are raised to permit the tank to be cleaned out. If desired the nozzles may be provided with hoods 17 for the purpose of preventing the steam from rising. They are shown as located in pairs. As the direction of steam into the tank in this manner for heating purposes would tend to disturb the water and bring the sediment to the top, it is preferred to introduce most of the steam for heating purposes by means of the nozzles 15 through separate pipes 18. The pipes 16 and 18 are provided with valves 19 and 20 respectively by means of which the valves of each set and even of each pair can be regulated independently either by hand or mechanically as may be desired. The nozzles in each case are so constructed as to increase the heating efficiency of the steam and prevent the pounding action which ordinarily takes place when steam is introduced into water.

In Fig. 3 a preferred form of nozzle is shown in which the end of the pipe 18 that enters the tank extends into the tank for some little distance. Immediately surrounding the pipe and fixed to the side wall of the tank is a support 21 on which, and surrounding the open end of the pipe, is a tube or guard 22. This guard is shown as of substantially uniform diameter throughout, except that it is enlarged at a point behind the open end of the pipe 18 to form a drum 23 having openings 24 therein. Through these openings the water of the tank may enter the guard so as to flow along the same in the direction in which the steam flows. The guard 22 in the form in which it is illustrated in Fig. 3 consists of a long tube which extends out into the tank to a considerable distance beyond the end of the pipe 18, and it is provided with perforations throughout the principal part of its length.

In Fig. 4 is shown a guard 25 considerably shorter than the guard 22 and having an open end instead of the perforations. This guard has a drum 23 and perforations 24 as in the other case, and is designed more especially for cleaning out purposes, although it can be used merely for heating.

In both forms it will be observed that the steam is forced through the end of the pipe 18 into a body of water located in the guard which must be discharged into the main body of water in the tank at some distance from the end of the pipe 18, consequently the steam has a longer travel through the water before it begins to rise in the tank, and its heating effect is proportionately greater for this reason. In the form shown in Fig. 3 also the steam is necessarily broken up so that large bubbles cannot ascend through the water. For both of these reasons the steam is caused to give up practically all its heat to the water instead of rising directly from the end of the pipe 18 and reaching the surface of the water in the form of uncondensed steam. Another beneficial result is that the water introduced through the openings 24 flows along the surface of the pipe 18 and necessarily becomes heated to some extent before it comes into direct contact with the steam. Consequently the steam does not come into contact with such cold water as is the case in ordinary practice, and the pounding is reduced. Furthermore, without the guard, the water rushes in from all directions to fill the spaces left by the condensation of the steam, but when the guard is employed the water can come in only from the rear as has been indicated, and in a slightly heated condition. This also seems to reduce the pounding noise. Moreover, there is a comparatively quiet body of water around the part of the nozzle between the first perforations, or the open end of the guard 25, and the drum 23 which is gradually heated, and which serves to protect the incoming steam from being condensed with the usual rapidity. In other words, the steam commences to be condensed in the pipe 18 by the water flowing along the same, and when it reaches the end of this pipe it comes into contact with warmer water than is usually the case flowing in the same direction as the steam, so that it is condensed more gradually and throughout a longer course of travel. This has the effect of largely preventing the pounding noise which is ordinarily heard in cases of this kind, and in addition thereto it provides for more thoroughly condensing all the steam so that very little, if any uncondensed steam is discharged at the surface of the water in the form of large bubbles. Moreover, in the form shown in Fig. 3, the bubbles of steam are more throughly broken up and distributed through the tank.

The hood shown at 17 in Fig. 1 may be employed with the guard 22 shown in Fig. 3, or with the form shown in Fig. 4 as desired.

While I have illustrated and described a particular use of the invention and two forms in which it may be embodied, I am aware that many modifications may be made therein by any person skilled in the art, and that it may be employed for various kinds of tanks without departing from the scope of the invention as expressed in the claims.

Therefore, I do not wish to be limited to the particular form and use shown, but What I do claim is:—

1. The combination with a water tank having a sloping bottom of steam pipes and downwardly inclined nozzles connected with said steam pipes for directing steam into the tank located near the upper part of said bottom, whereby said nozzles will direct the steam and a current of water downwardly along said bottom and remove sediment and the like therefrom.

2. The combination with a water tank having downwardly converging sloping bottoms, of downwardly inclined nozzles for directing steam into the tank located near the upper sides of said bottoms, additional nozzles entering the tank at the side between the bottoms, and independent valves for controlling the supply of steam to said nozzles.

3. The combination with a water tank, of clean out steam inlet nozzles near, and parallel with, the bottom of the tank, and a steam inlet nozzle at a distance therefrom, said nozzles comprising a support secured to the side wall of the tank and a guard on said support extending into the tank beyond the open end of the nozzle.

4. The combination with a water tank having a sloping bottom, of steam pipes and downwardly inclined nozzles connected with said steam pipes for directing steam into the tank, and hoods located over said steam pipes for preventing the steam from rising directly from the ends thereof, whereby the steam and current of water will be directed downwardly along said bottom.

5. The combination with a water tank, of a steam injecting nozzle having a support fixed to a wall of the tank, a pipe entering the tank through said wall and support and carried by said support, means carried by said support for directing water from the tank along the outer surface of the pipe toward the discharge end thereof, and a hood covering the top of said nozzle to prevent the rising of the steam directly from the end thereof.

6. The combination with a water tank, of a steam injecting nozzle having a support fixed to the wall of the tank, a pipe entering the tank through said wall and support and carried by said support, and means carried by said support for directing water from the tank along the outer surface of the pipe toward the discharge end thereof.

7. The combination with a water tank having a slanting side, of a nozzle for directing steam into the tank for heating the same, comprising a hollow support mounted on the slanting side, an open ended pipe projecting into the tank through said slanting side and support, and a guard located around the end of said pipe and having openings at the rear of said end, said guard being carried directly by said support.

8. A nozzle for directing steam into a tank comprising a pipe entering the tank, and a substantially horizontal guard of larger diameter than the pipe surrounding the end of the pipe and extending beyond said end, said guard having a drum at the rear of the end of the pipe and surrounding it provided with perforations for admitting water to the guard from the tank.

9. A nozzle comprising an open ended pipe, and a perforated guard supported by said pipe and having a cylindrical portion surrounding the end of the pipe and extending beyond the end thereof, said guard having a drum surrounding said pipe and of larger diameter than the guard and provided with perforations in its walls.

In testimony whereof I have hereunto set my hand, in the presence of two subscribing witnesses.

ALLAN C. SARGENT.

Witnesses:
OSBORN H. CILLEY,
E. A. NORMINGTON.